Sept. 8, 1925.

H. S. ZINSITZ

VEHICLE SPRING

Filed Feb. 23, 1922

1,552,790

WITNESSES

M. E. Downey

C. L. Waal

INVENTOR

Herman S. Zinsitz,

By R. S. Caldwell

ATTORNEY

Patented Sept. 8, 1925.

1,552,790

UNITED STATES PATENT OFFICE.

HERMAN S. ZINSITZ, OF MILWAUKEE, WISCONSIN.

VEHICLE SPRING.

Application filed February 23, 1922. Serial No. 538,612.

*To all whom it may concern:*

Be it known that I, HERMAN S. ZINSITZ, a citizen of the United States, and resident of Milwaukee, in the county of Milwaukee and State of Wisconsin, have invented new and useful Improvements in Vehicle Springs, of which the following is a description, reference being had to the accompanying drawings, which are a part of this specification.

The invention relates to vehicle springs.

The usual vehicle springs made of spring steel have several disadvantages, some of which are the high cost of a properly made spring, the difficulty of oiling and the necessity for keeping the spring leaves lubricated. The object of this invention is to provide a spring in which the use of spring steel leaves is avoided and in which the elastic suspension is obtained by rubber blocks which take up the shocks and check the reaction of such shocks.

With the above and other objects in view the invention consists in the construction and the several features thereof hereinafter described and all equivalents.

Figure 1:
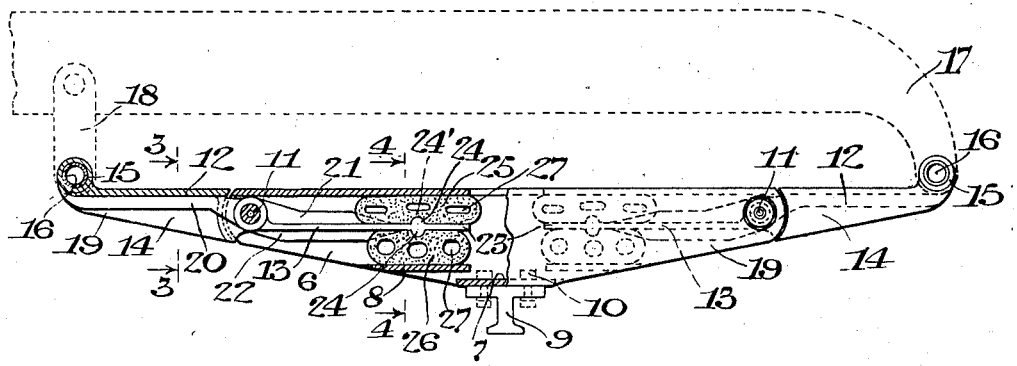
Figure 2:
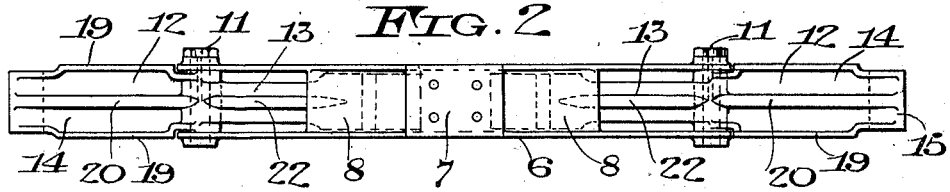
Figure 3:
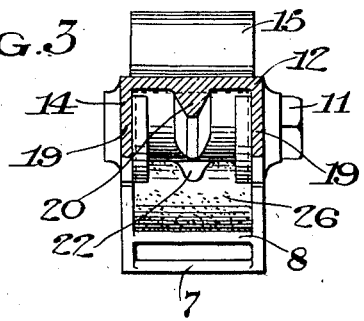
Figure 4:
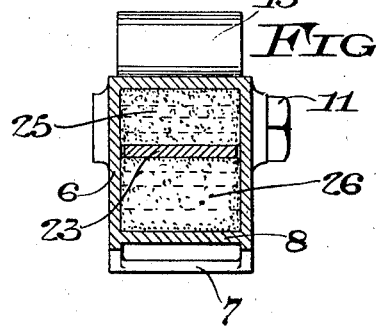
Figure 5:
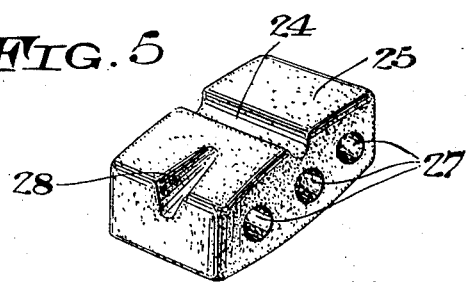

In the drawings: Fig. 1 is a side view of a spring embodying the invention, parts being broken away and parts being shown in section; Fig. 2 is a bottom plan view thereof; Fig. 3 is a section taken on the line 3—3 of Fig. 1; Fig. 4 is a section taken on the line 4—4 of Fig. 1; Fig. 5 is a perspective view of one of the spring members.

For the purpose of illustrating and explaining the invention, I have shown a semi-elliptic form of spring but it will be understood that the invention is applicable to quarter-elliptic or full elliptic forms.

As shown, a channel frame member or beam 6 forming a support has an attaching pad portion 7 and transversely disposed plates 8 secured thereto in any suitable manner, as by welding, the web of said channel not extending over the portion 7. Whereas in the present instance, a semi-elliptic type of suspension is used the pad 7 is located in the central portion of the beam and is rigidly secured to the axle 9 of the vehicle by means of bolts 10 or other suitable fastening means.

The ends of the beam have pivot openings in which bolts 11, similar to the usual shackle bolts, are mounted and levers 12 are pivotally mounted intermediate their ends upon said bolts 11 and have one of the arms 13 projecting into the space between the sides of the beam and their other arms 14 extending beyond the beam and provided with apertured bosses 15 to receive the shackle bolts 16 which connect the spring to the vehicle frame 17 at one end and a link 18 at the other end. These levers 12 have reinforcing side flanges 19 and reinforcing ribs 20, 21 and 22. The inner ends 23 of the arms 13 are substantially flat with the exception of transversely extending ribs 24.

The inner end 23 of each lever is interposed between elastic blocks 25 and 26, preferably of soft rubber, having transversely extending apertures 27 and transversely extending recesses 24'. The block 25 fits between the upper side of the end 23 and the web or top of the beam 6 and the block 26 fits between the underside of the end 23 and the plate or ledge 8, the ribs 24 being seated in the recesses 24' at the central portions of the blocks to prevent shifting of the blocks. Both blocks 25 and 26 when inserted between the frame and the lever 12 are under some compression and the upper block 25 is preferably put in first and then the lower block 26 is inserted while the upper block is compressed by the lever. This mounting of the inner arms 13 of the levers 12 between the blocks 25 and 26 provides an elastic suspension between the vehicle frame and the axle, and the downward movement of the vehicle frame swings the arms 13 upwardly thereby compressing the blocks 25 while the upward movement of said frame swings the arms 13 downwardly thereby compressing the blocks 26. In either case one of the blocks between which the arm 13 of the lever 12 is mounted is put under compression to absorb the shock while the other acts as a snubber to check the reaction that occurs after the shock. The blocks 25 and 26 are provided with recesses such as the recess 28 shown in connection with the block 25 in Fig. 5 to receive the ribs 21 or 22. The blocks 25 and 26 are also interchangeable but have been referred to by different designating numerals for the purpose of explanation. The blocks may be readily replaced, if necessary, at a small expense compared to repairs on steel springs and the replacement of broken leaves.

What I claim as my invention is:

1. In a vehicle spring, the combination of a lever operatively connected to the frame of the vehicle, a support secured to the vehicle axle and carrying said lever, and rubber blocks interposed between the support and lever and acted on by said lever, said rubber blocks having cored passages extending normally to the direction of compression to facilitate the flow of rubber when under compression.

2. In a vehicle spring, the combination of a lever operatively connected to the frame of the vehicle, a support secured to the vehicle axle and having spaced walls forming a hollow rectangular section, said lever being pivotally connected intermediate its ends to said support and having its free end projecting into the rectangular space between said walls, and apertured elastic rubber blocks disposed between said lever and opposite walls of said support for compression by said lever and having grooves in their surfaces to be engaged by projecting parts of said lever for retaining them in place.

3. In a vehicle spring, the combination of a lever operatively connected to the frame of the vehicle, a support secured to the vehicle axle and having spaced walls, a pivotal connection between the intermediate portion of said lever and support, and compressible rubber blocks interposed between the walls of said beam and one of the arms of said lever, said lever having transversely extending ribs and said blocks having transversely extending recesses to receive said ribs.

4. In a vehicle spring, the combination with relatively movable members, of an elastic rubber block of rectangular shape adapted to be inserted between said members and to be compressed by their relative movement, said blocks having cored openings extending normally to the direction of compression to facilitate the flow of rubber when under compression and recesses extending into one of its faces for receiving projecting parts of one of said members to prevent shifting of the block.

In testimony whereof, I affix my signature.

HERMAN S. ZINSITZ.